US012566697B2

(12) United States Patent　　　　　(10) Patent No.:　US 12,566,697 B2
Devineni et al.　　　　　　　　　　　　(45) Date of Patent:　　　Mar. 3, 2026

(54) EFFICIENT USAGE OF WRITEBOOSTER BUFFER IN PRESERVE USER SPACE MODE

(71) Applicant: QUALCOMM INCORPORATED, San Diego, CA (US)

(72) Inventors: Sravani Devineni, Hyderabad (IN); Kaustub Naidu Paila Ram, Hyderabad (IN); Madhu Yashwanth Boenapalli, Hyderabad (IN); Sai Praneeth Sreeram, Anantapur (IN); Surendra Paravada, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/751,002

(22) Filed: Jun. 21, 2024

(65) Prior Publication Data

US 2025/0390429 A1　　Dec. 25, 2025

(51) Int. Cl.
G06F 12/02　　　　(2006.01)

(52) U.S. Cl.
CPC .. G06F 12/0246 (2013.01); *G06F 2212/7203* (2013.01)

(58) Field of Classification Search
CPC ..................... G06F 12/0246; G06F 2212/7203
See application file for complete search history.

(56) References Cited

U.S. PATENT DOCUMENTS

| | | | |
|---|---|---|---|
| 9,372,792 B1 * | 6/2016 | Weingarten | ......... G06F 12/0246 |
| 9,501,392 B1 * | 11/2016 | Weingarten | ......... G06F 12/0246 |
| 2013/0042059 A1 * | 2/2013 | Guo | .................... G06F 12/0638 |
| | | | 711/170 |
| 2013/0227207 A1 * | 8/2013 | Katz | ................... G06F 12/0246 |
| | | | 711/103 |
| 2019/0121725 A1 * | 4/2019 | Sehgal | ................... G11C 16/10 |
| 2020/0042223 A1 * | 2/2020 | Li | ........................... G11C 29/52 |
| 2020/0159419 A1 * | 5/2020 | Li | .......................... G06F 3/068 |
| 2022/0075552 A1 * | 3/2022 | Dayan | .................. G06F 16/2246 |
| 2022/0374163 A1 * | 11/2022 | Colella | ................. G06F 3/0608 |
| 2023/0229347 A1 * | 7/2023 | Zilberstein | .............. G06F 3/068 |
| | | | 711/154 |
| 2024/0004797 A1 * | 1/2024 | Kuper | ................. G06F 12/0842 |
| 2024/0281383 A1 * | 8/2024 | Tiwari | .................. G06F 3/0659 |
| 2025/0110668 A1 * | 4/2025 | Zhang | .................. G06F 3/0679 |

* cited by examiner

*Primary Examiner* — Tasnima Matin
(74) *Attorney, Agent, or Firm* — Smith, Tempel, Blaha, LLC

(57)　　　　　　ABSTRACT

In a flash memory device, portions of a write buffer may be merged into a user space logical unit based on a measurement of write buffer usage. In a Universal Flash Storage (UFS) device configured with the WriteBooster feature, the write buffer may be a WriteBooster buffer. When it is determined that a user space logical unit has become full, then the write buffer usage may be determined. Portions of the write buffer that are least used or have the longest remaining lifetime may be preferentially merged into the user space logical unit.

17 Claims, 6 Drawing Sheets

EFFICIENT USAGE OF WRITEBOOSTER BUFFER IN PRESERVE USER SPACE MODE

DESCRIPTION OF THE RELATED ART

Universal Flash Storage (UFS) is a type of managed, non-volatile memory. In a UFS device, the management tasks may be performed by an embedded controller operating in accordance with firmware. UFS devices may be included in various types of computing devices, including portable computing devices such as smartphones, tablet computers, etc. UFS is based on the Small Computer Systems Interface (SCSI) protocol. As in SCSI, in UFS the physical storage may be addressed as so-called logical units, where logical unit numbers (LUNs) identify the logical units. Some LUNs may be configured as user space to store user data accessible to application software or other user-level software, while other LUNs may be configured to store system data (e.g., boot software) accessible to an operating system or other system-level software.

The physical storage of a UFS device may comprise triple-level cell (TLC) NAND flash, which may be more economical and have higher capacity than, for example, single-level cell (SLC) NAND flash. However, SLC NAND flash may have some advantages over TLC NAND flash, including low latency (i.e., high speed) and high endurance or lifetime. Flash memory endurance or lifetime may be measured in terms of number of Program/Erase (P/E) cycles before data errors become likely. Every write operation experienced by the flash physical storage may reduce its remaining lifetime.

WriteBooster is a UFS feature that can be enabled by a host to configure a WriteBooster buffer in the physical storage. The WriteBooster buffer may be SLC flash, which has the advantage of enabling write requests to be processed with low latency. Data in the WriteBooster buffer may be flushed into the TLC flash when the UFS device is idle. This combination of a low-latency write buffer, and well-controlled flushing of the buffer, may improve overall write performance. The WriteBooster feature provides two configuration options. The first option, which may be referred to as User Space Reduction, maintains the WriteBooster buffer even when the physical storage configured for user space becomes full, and thus reduces the total amount of physical storage that can be configured for user space at the time of device provisioning. The second option, which may be referred to as Preserve User Space, merges the WriteBooster buffer associated with the user space into the user space when the physical storage configured for user space is full or nearly full. A disadvantage of Preserve User Space mode is that there could be performance degradation when the physical storage used for the WriteBooster buffer is merged into the user space, since the UFS device has to make internal data structure adjustments as well as flush the WriteBooster buffer data. Improvements relating to the WriteBooster feature may be desirable.

SUMMARY OF THE DISCLOSURE

Systems, methods and other examples are disclosed for managing a flash memory device having a write buffer. The flash memory device may be, for example, a Universal Flash Storage (UFS) device configured with a WriteBooster feature.

An exemplary method for managing a flash memory device having a write buffer may include determining whether a user space logical unit is full. The method may further include determining write buffer usage. The method may still further include merging one or more portions of the write buffer into the user space logical unit based on the write buffer usage when the user space logical unit is full.

An exemplary system in a flash memory device may include flash memory physical storage and a flash memory controller. The flash memory physical storage may be configurable into a user space logical unit and a write buffer. The flash memory controller may be configured to determine whether the user space logical unit is full. The flash memory controller may further be configured to determine write buffer usage. The flash memory controller may still further be configured to merge one or more portions of the write buffer into the user space logical unit based on the write buffer usage when the user space logical unit is full.

An exemplary system for managing a flash memory device may include means for determining whether a user space logical unit is full. The system may further include means for determining write buffer usage. The system may still further include means for merging one or more portions of the write buffer into the user space logical unit based on the write buffer usage when the user space logical unit is full.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
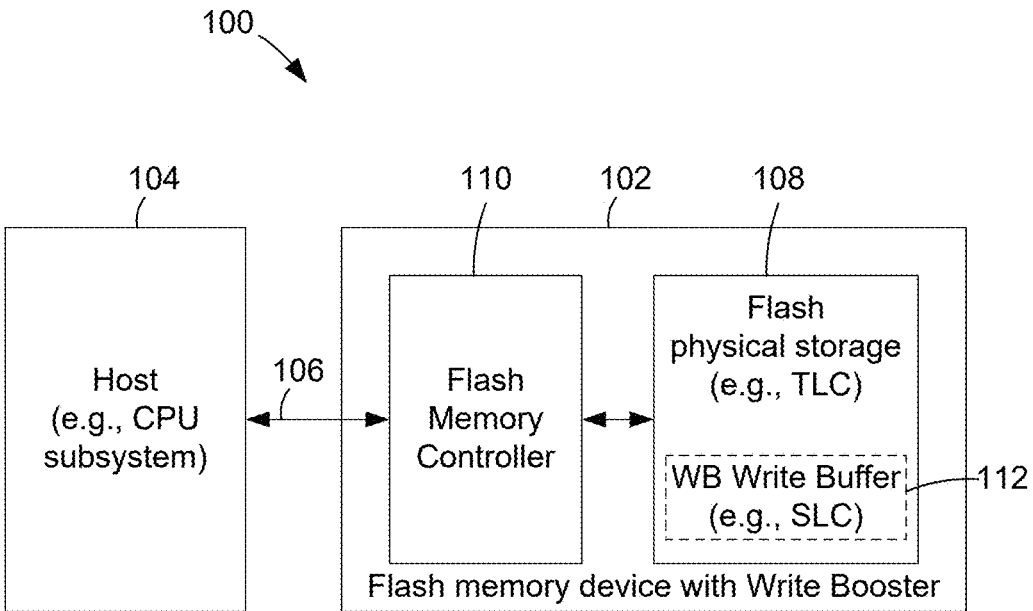
FIG. 1 is a block diagram of a system in which a flash memory device is coupled to a host device, in accordance with exemplary embodiments.

As shown in FIG. 1, in an illustrative or exemplary embodiment a system 100 may include a flash memory device 102 coupled to a host device 104 via a data communication link 106. The flash memory device 102 may be a Universal Flash System (UFS) device and, accordingly, may operate in accordance with principles set forth by the Joint Electron Device Engineering Council (JEDEC) in, for example, JEDEC Standard No. 220F, etc. The flash memory device 102 may include flash physical storage 108 and a flash memory controller 110. The flash physical storage 108 may comprise triple-level cell (TLC) NAND flash. The flash memory controller 110 (e.g., a UFS memory controller) may control the storage of data in, and retrieval of data from, the flash physical storage 108 in response to commands received from the host device 104 via the data communication link 106. The host device 104 may be, for example, a central processor unit (CPU) subsystem. The flash memory device 102 and the host device 104 may be included in a computing device (not shown in FIG. 1), such as, for example, a desktop, laptop, or tablet computer, a smartphone, a portable game console, etc.

The flash memory device 102 may be configured to provide a UFS feature known as WriteBooster. In accordance with the WriteBooster feature, the flash physical storage 108 may be configured to include a WriteBooster Write Buffer (WB) 112, which may also be referred to as the WriteBooster buffer 112. For example, the WriteBooster buffer 112 may be a portion of the TLC NAND flash that is configured as single-level cell (SLC) NAND flash. (TLC NAND flash configured as SLC NAND flash may also be referred to as pseudo-SLC or pSLC NAND flash.) Portions of the WriteBooster buffer 112 consisting of a group of one or more SLC NAND flash cells may for convenience sometimes be referred to herein as SLCs. All of the flash physical storage 108 except for the WriteBooster buffer 112 thus may consist of TLC NAND flash, with only the WriteBooster buffer 112 consisting of SLC (i.e., pSLC) NAND flash. The WriteBooster feature may be used to improve overall write performance by initially placing write data received from the host device 104 in the WriteBooster buffer 112, which is an operation that can be performed with low latency, and then later (e.g., when the flash memory device 102 is idle or not handling write or read requests from the host device 104) flushing the data written in the Write-Booster buffer 112 into the remainder of the flash physical storage 108 (consisting of the TLC NAND flash). The flash memory controller 110 may be configured to control the foregoing operations and otherwise control the WriteBooster feature.

Various aspects of the WriteBooster feature may be configurable by the host device 104, by sending configuration commands to the flash memory controller 110 (FIG. 1) via the data communication link 106, or by programming or provisioning (e.g., in firmware) the flash memory controller 110. What may be referred to herein for convenience and clarity as configuration commands may involve what are referred to in the lexicon of UFS as descriptors, attributes and flags. For purposes of convenience and clarity, details at the level of UFS descriptors, attributes, flags, etc., are not described herein. Configurable aspects of the Write Booster feature that may be relevant to the solutions described herein are described below.

Figure 2:
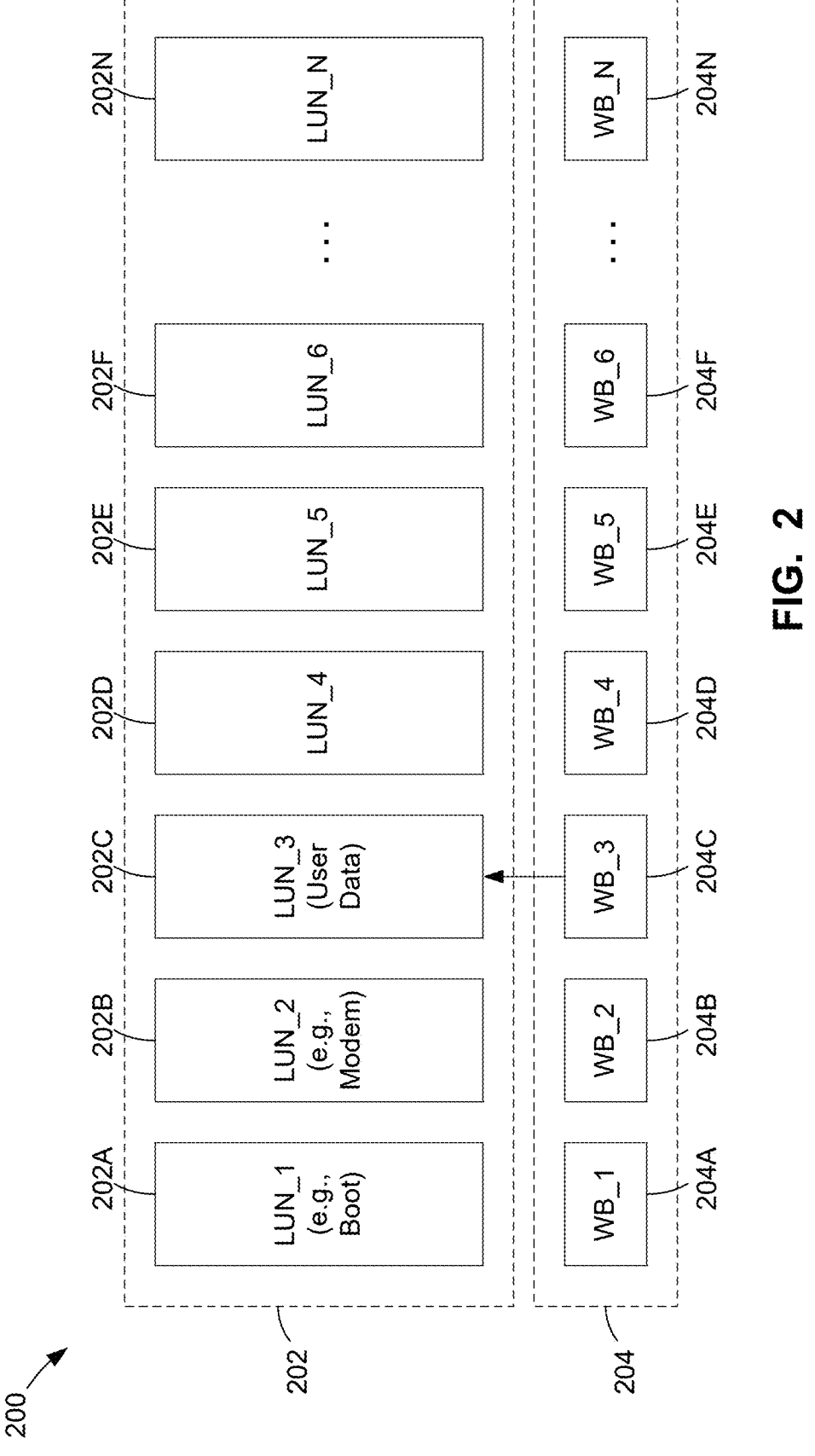
FIG. 2 illustrates flash physical storage having logical units and a write buffer configured in a Dedicated mode, in accordance with exemplary embodiments.

In FIG. 2, flash physical storage 200 is shown in conceptual form organized or configured as a number (N) of logical units (also referred to as logical unit numbers or LUNs) 202 and a WriteBooster buffer 204. The flash physical storage 200 may be an example of the above-described flash physical storage 108 (FIG. 1). In the illustrated example, the LUNs 202 may consist of a first LUN 202A (also referred to as "LUN_1"), a second LUN 202B (also referred to as "LUN_2"), a third LUN 202C (also referred to as "LUN_3"), a fourth LUN 202D (also referred to as "LUN_4"), a fifth LUN 202E (also referred to as "LUN_5"), a sixth LUN 202F (also referred to as "LUN_6"), etc., through an Nth LUN 202N (also referred to as "LUN_N"). Some of the LUNs 202 may be configured for specific uses. For example, the first LUN 202A may be configured to store boot data, used by an operating system (not shown) in booting the computing device, while the second LUN 202B may be configured to store data relating to a transceiver or modem subsystem (not shown), and the third LUN 202C may be configured to store user data. The term "user data" may refer to any data used by application software or other user-level software (not shown) that may execute on the host device 104 (FIG. 1). The user data LUN or third LUN 202C in the illustrated example may also be referred to as the user data space. Although in the illustrated example the only one of the LUNs 202 that is configured as user data space is the third LUN 202C, in other examples (not shown) more than one LUN could be configured as user data space.

In the illustrated configuration, the WriteBooster buffer 204 is organized in the form of N WriteBooster buffers (WBs), where: a first WB 204A (also referred to as "WB_1") is dedicated to or is associated with the first LUN 202A; a second WB 204B (also referred to as "WB_2") is dedicated to or is associated with the second LUN 202B; a third WB 204C (also referred to as "WB_3") is dedicated to or is associated with the third LUN 202C; a fourth WB 204D (also referred to as "WB_4") is dedicated to or is associated with the fourth LUN 202D; a fifth WB 204E (also referred to as "WB_5") is dedicated to or is associated with the fifth LUN 202E; a sixth WB 204F (also referred to as "WB_6") is dedicated to or is associated with the sixth LUN 202F; etc., though an Nth WB 204N, which is dedicated to or is associated with the Nth LUN 202N. This organization or configuration of the WriteBooster buffer 204 may be selected or changed in response to a configuration command received from the host device 104 (FIG. 1). The configuration shown in FIG. 2 may be referred to as "Dedicated." The flash memory controller 110 (FIG. 1) may configure the WriteBooster buffer 204 as shown in FIG. 2.

In addition to the above-described WriteBooster buffer configuration, another configurable aspect of the Write-Booster feature affects operation in the event that a LUN 202 configured as user space (which in the illustrated example is the third LUN 202C) becomes full. A LUN 202 may be "full" when all or most of its storage space has been written to. A threshold value may determine the size or storage capacity of each LUN 202, and this threshold value may be set or configured. Accordingly, the term "full" as used herein refers to a condition in which the amount of storage space that has been written to a LUN 202 has reached the configured threshold. The WriteBooster buffer feature provides two options, which may be referred to as User Space Reduction and Preserve User Space. The flash memory controller 110 (FIG. 1) may configure one of these options. When the Preserve User Space option has been selected or configured, and when a LUN 202 that has been configured as user space becomes full, the flash memory controller 110 (FIG. 1) merges the associated one of the WBs 204 into that LUN 202 (and that WB 204 ceases to be usable as an independent entity). In the example illustrated in FIG. 3, when the third (i.e., user space) LUN 202C becomes full, the third WB 204C is merged into the third LUN 202C (and the third WB 204C ceases to be usable as an independent entity). This merging operation is conceptually indicated by the arrow from the third WB 204C to the third LUN 202C.

Although the merging of the third WB 204C into the third LUN 202C in the example illustrated in FIG. 2 may have the benefit of increasing the amount of space available to be written to the third LUN 202C (i.e., preserving the configured threshold amount of user space), there may also be disadvantages. For example, after the merging, user data will be written directly to the third LUN 202C, without the benefit of low-latency buffering. Also, for example, it may be noted that the filling of the third (i.e., user space) LUN 202C in the example illustrated in FIG. 2 may be associated with heavy write traffic having been directed to the third LUN 202C and, accordingly, to its associated third WB 204C. The heavy write traffic corresponds to an increased number of Program/Erase (P/E) cycles that the SLCs of the third WB 204C have experienced, thereby reducing the remaining lifetime of those SLCs. The solutions described herein may address these disadvantages and others.

In one aspect, the solutions may include performing write buffer merging in an intelligent or controlled manner, based on the remaining lifetime (also referred to as "health" or "endurance") of the flash memory cells of the write buffer. Flash memory cell lifetime or health may be measured in terms of the number of P/E cycles the cells have experienced.

Figure 3:
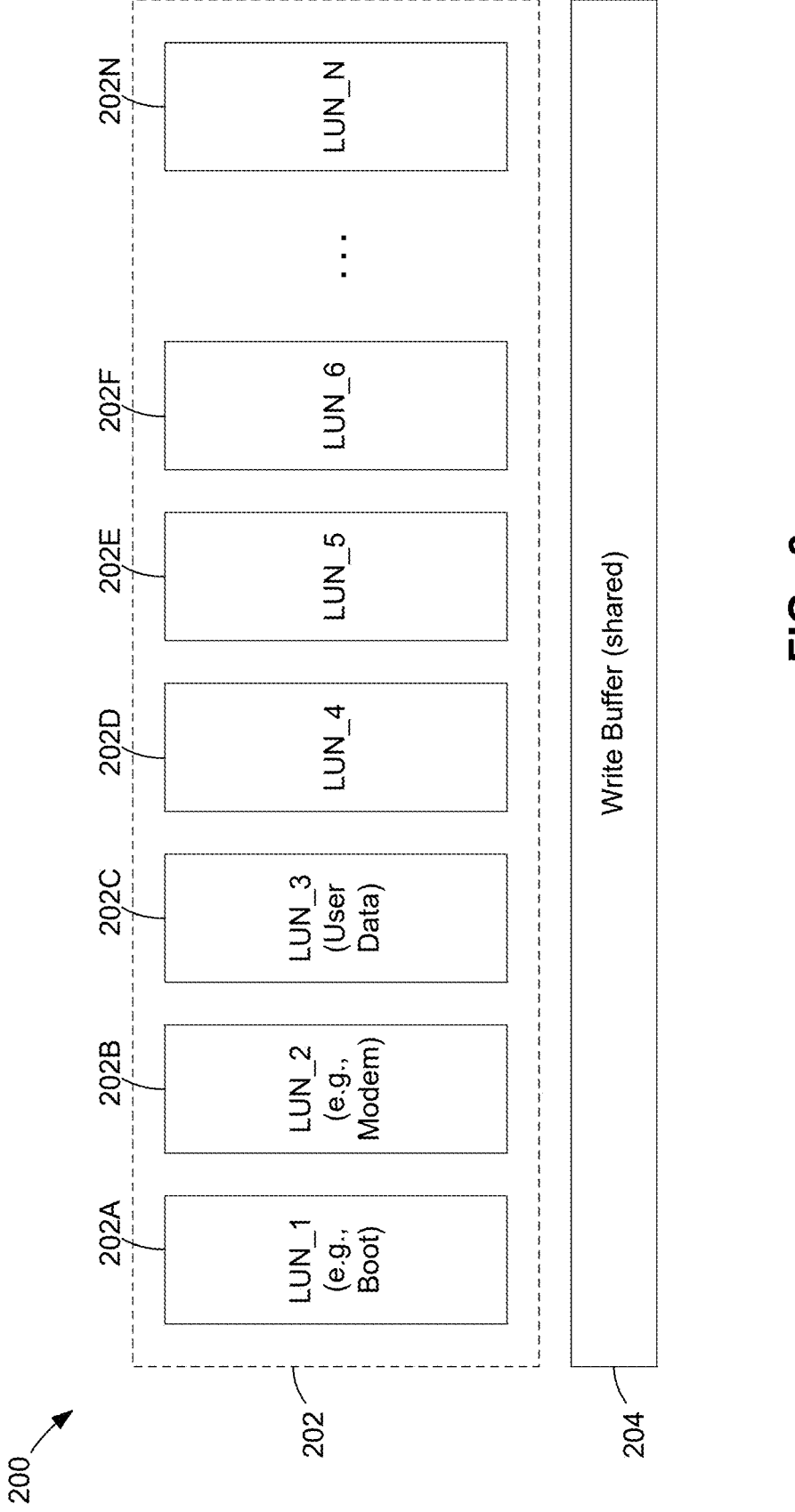
FIG. 3 illustrates flash physical storage having logical units and a write buffer configured in a Shared mode, in accordance with exemplary embodiments.

In FIG. 3, the configuration of the WriteBooster buffer 204 has been changed to a "Shared" configuration from the "Dedicated" configuration described above with regard to FIG. 2. The configuration may be changed or switched by the flash memory controller 110 (FIG. 1). In the Shared configuration, the above-described individual WBs 204A-204N do not exist as usable entities and are therefore not shown in FIG. 3.

Figure 4:
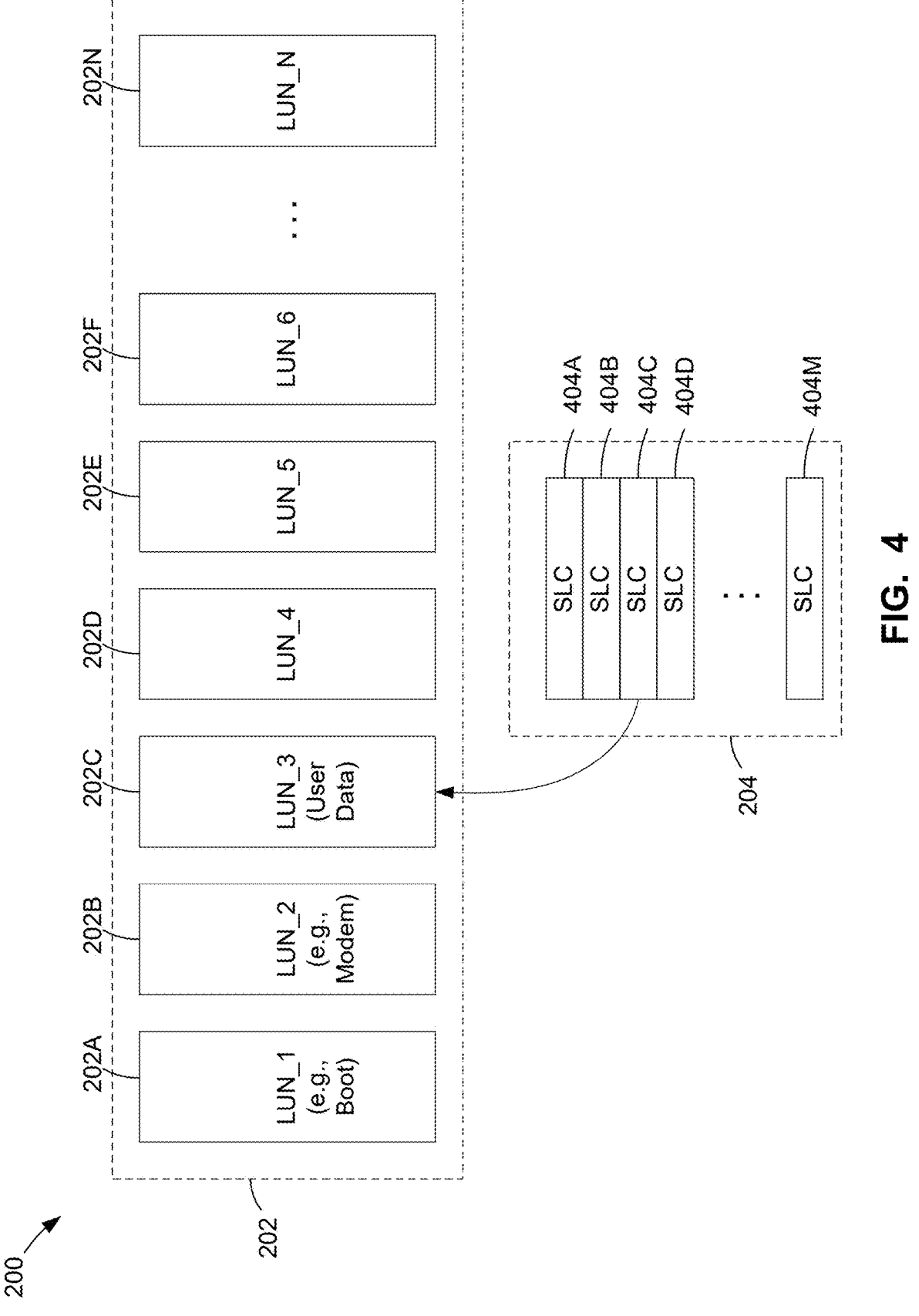
FIG. 4 illustrates merging a least-used portion of the shared write buffer of FIG. 3 into a user space logical unit, in accordance with exemplary embodiments.

In FIG. 4, the same flash physical storage 200 described above is shown in the Shared configuration. However, the WriteBooster buffer 204 is depicted in a different manner to emphasize that although in the Shared configuration the above-described individual WBs 204A-204N (FIG. 2) do not exist as usable entities, the underlying (SLC) flash memory cells of the WriteBooster buffer 204 continue to exist. In FIG. 4, the SLCs 404A, 404B, 404C, 404D, etc., through 404M conceptually represent such cells of the WriteBooster buffer 204. Each of the above-described WBs 204A-204N (FIG. 2) may comprise a group of one or more of the SLCs 404A-404M.

The flash memory controller 110 may maintain a list (not shown) in which is stored the remaining lifetime (or conversely, the amount of the original lifetime already used) of each SLC 404A-404M, as represented by the number of P/E cycles that each SLC 404A-404M has experienced. When the flash memory controller 110 determines that, for example, the user space LUN 202C has become full, the flash memory controller 110 may query the list to determine which of the SLCs 404A-404M is least used, i.e., has experienced the lowest number of P/E cycles. The flash memory controller 110 may then merge the least-used one of the SLCs 404A-404M into the user space LUN 202C, as indicated by the arrow from the SLC 404C to the user data LUN 202C. It should be noted that the SLCs 404A-404M are not shown in FIG. 4 ranked in order of usage; any of the SLCs 404A-404M may be the least used among them. In the illustrated example, the determination that the SLC 404C is the least used is intended only as an example. The flash memory controller may iteratively perform this merging operation using the next-least-used one of the SLCs 404A-404M, and so on, until the user space LUN 202C is no longer "full."

Figure 5:
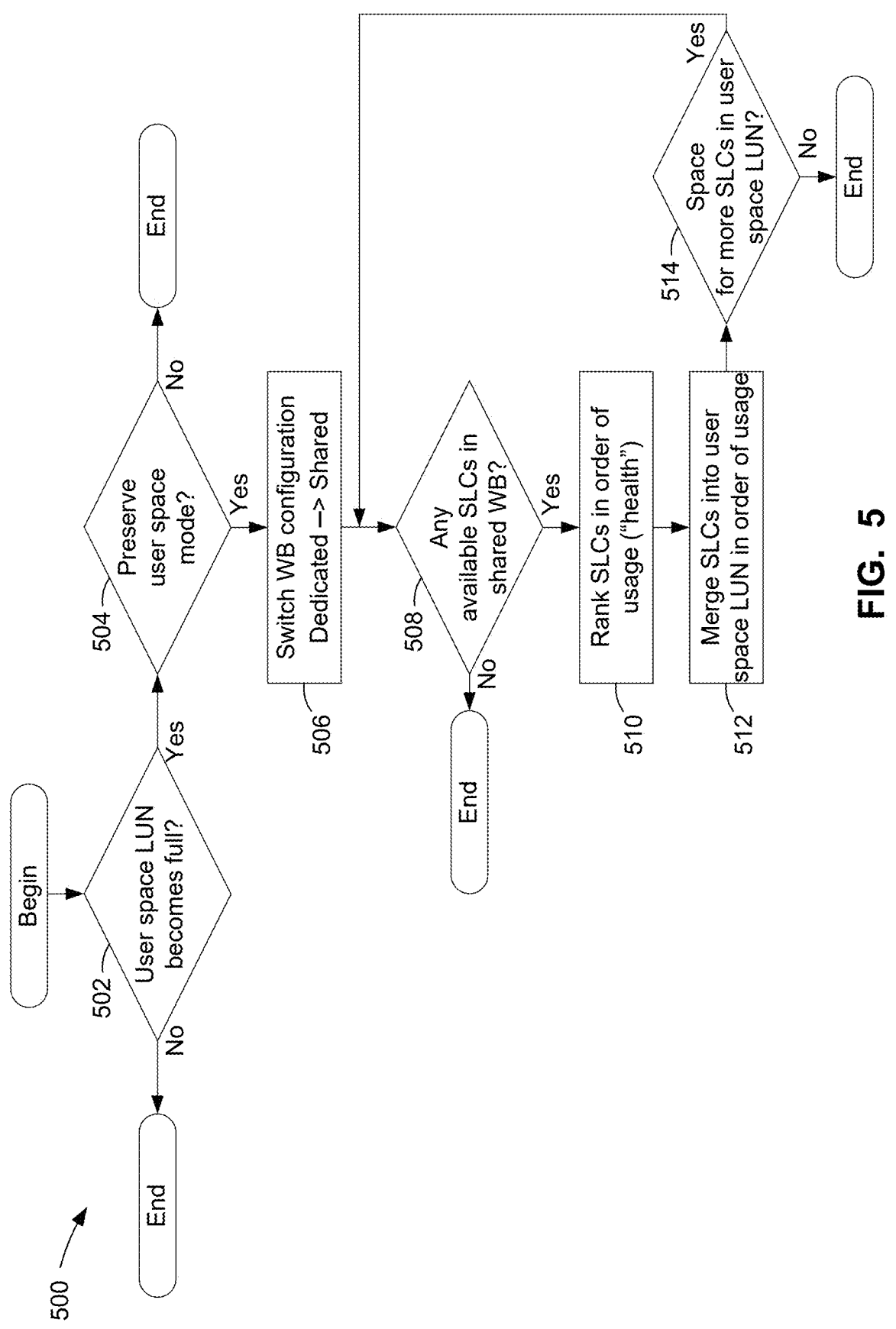
FIG. 5 is a flow diagram illustrating a method for managing a flash memory device, in accordance with exemplary embodiments.

In FIG. 5, a method 500 for managing a flash memory device is illustrated in flow diagram form. The flash memory device may be, for example, a UFS device configured with the WriteBooster feature as described above. As indicated by block 502, it may be determined whether a user space logical unit is full. This determination may be performed by, for example, a flash memory controller of the device. If it is determined that the user space logical unit is not full, then the remainder of the method 500 may not be performed.

As indicated by block 504, when it is determined (block 502) that the user space logical unit is full, then it may be determined whether the flash memory device is configured in Preserve User Space mode. This determination may be performed by, for example, a flash memory controller of the device. If it is determined that the flash memory device is not configured in Preserve User Space mode, then the remainder of the method 500 may not be performed. That is, if a host device or a provisioning entity has configured the flash memory device in User Space Reduction mode, the host device or provisioning entity may prefer that the flash memory device refrain from merging a write buffer into the user space logical unit that has become full.

As indicated by block 506, when it is determined (block 502) that the user space logical unit is full and also determined (block 504) that the flash memory device is configured in Preserve User Space mode, then a write buffer configuration may be switched from Dedicated to Shared. This write buffer configuration switching may be performed by, for example, a flash memory controller of the device.

As indicated by block 508, after the write buffer configuration has been switched from Dedicated to Shared, then it may be determined whether there are any portions (SLCs in the example described above with regard to FIG. 4) of the shared write buffer that are available for merging. If it is determined that there are no available portions of the shared write buffer available for merging, then the method 500 may end.

As indicated by block 510, when it is determined that there are one or more portions of the shared write buffer that are available for merging, then the portions may be ranked in order of usage. As described above, usage or lifetime may be measured by P/E cycles experienced by SLCs or other such portions of the write buffer. This determination of write buffer usage may include determining a least-used SLC or portion (i.e., has experienced the lowest number of P/E cycles among all of the SLCs). This determination of write buffer usage may be performed by, for example, a flash memory controller of the device.

As indicated by block 512, one or more of the portions may be merged based on the determined write buffer usage into the user space LUN that has become full. Multiple portions (e.g., multiple SLCs) may be merged in order of their usage. As indicated by block 514, it may be determined whether there is space in the user space LUN to accommodate merging additional portions of the shared write buffer. For example, the least-used portion may be merged on a first iteration of the operations associated with blocks 508, 510, 512 and 514, and on each further iteration the next-least-used portion may be merged, until either it is determined (block 508) that there are no more portions available in the shared write buffer or it is determined (block 514) that there is no more space in the user space LUN to accommodate merging additional portions (whichever condition occurs first). Note that the method 500 illustrates operations that may occur when a user space LUN becomes full, and in examples in which there is more than one user space LUN the method 500 may be performed whenever any of those user space LUNs becomes full.

In an alternative method similar to the above-described method 500 (FIG. 5), the operations indicated by block 506, in which the write buffer configuration is switched from Dedicated to Shared, may be omitted. In such an alternative method, one of the dedicated WBs 204A-204N (FIG. 2) that has been determined to have the least-used SLCs may be merged into the user space LUN that has become full. For example, if it is determined that the user space LUN 202C has become full, and if it is determined that the WB 204E has the least-used SLCs, then the WB 204E may be merged into the user space LUN 202C instead of merging the WB 204C.

The manner in which the WriteBooster feature operates in relation to user space may be configurable. For example, three configuration options or selections may be provided. A first option may be the User Space Reduction mode. A second option may be the Preserve User Space mode described above with regard to FIG. 2, in which the write buffer that is dedicated to or associated with the user space LUN is merged into the user space LUN when it is determined that the user space LUN has become full. The Preserve User Space mode described above with regard to FIG. 2 may be referred to as the legacy Preserve user Space mode. A third option may be the Preserve User Space mode described above with regard to FIGS. 4-5, in which portions of the shared write buffer are merged into the user space LUN based on a measurement of their usage (e.g., P/E cycles) when it is determined that the user space LUN has become full. The Preserve User Space mode described above with regard to FIGS. 4-5 may provide advantages over the legacy Preserve User Space mode. One of these three configuration options or alternatives may be selected (i.e., configured) in a manner similar to which other configurable aspects of the UFS device may be configured. These three configuration options are intended only as examples, and others may occur to one of ordinary skill in the art in view of the solutions described herein.

Figure 6:
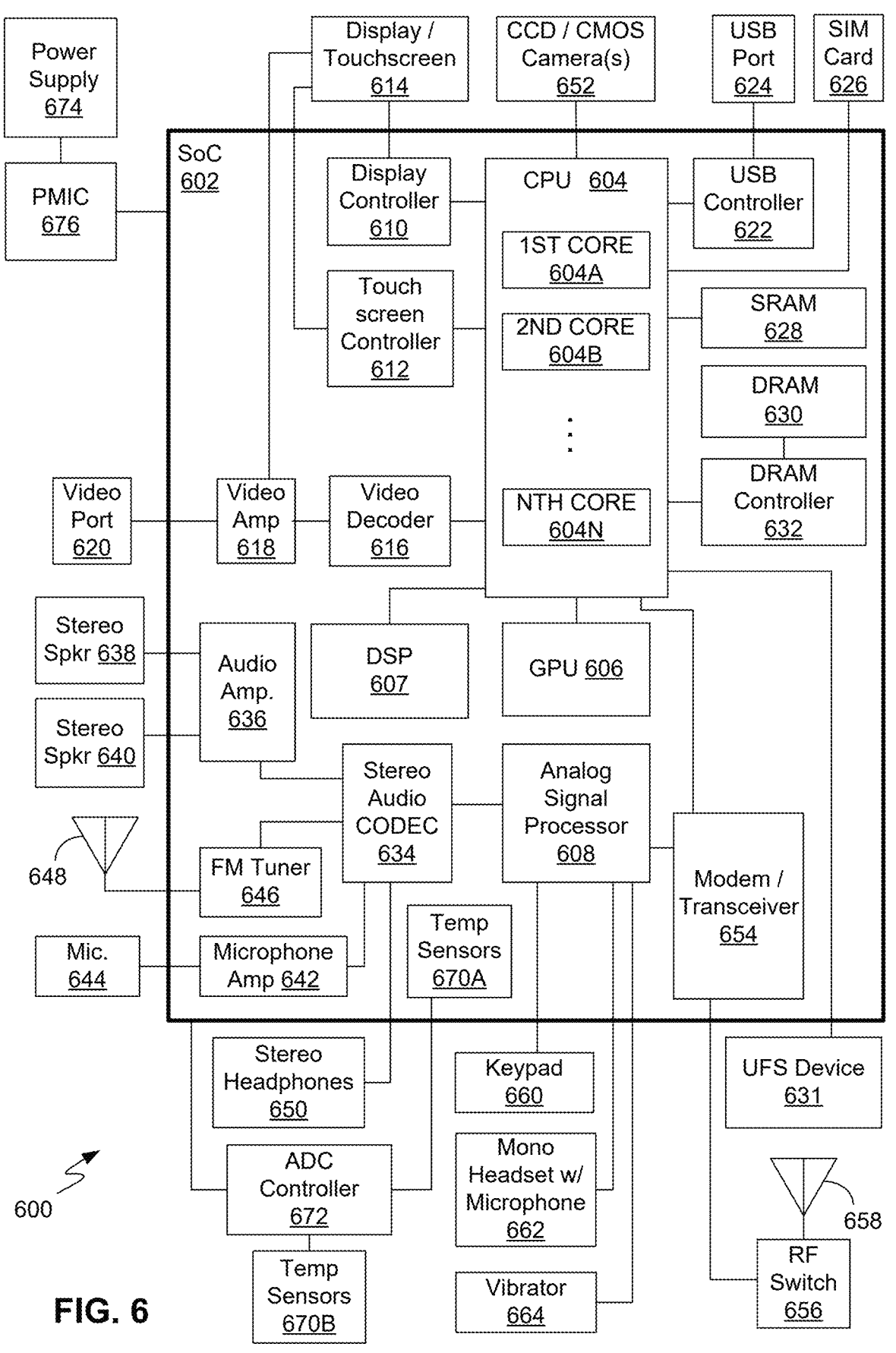
FIG. 6 illustrates an example of a portable computing device (PCD), in which exemplary embodiments of systems, methods, and other examples of managing a flash memory device may be provided.

FIG. 6 illustrates an example of a portable computing device (PCD) 600, in which exemplary embodiments of systems, methods, and other examples of managing a flash memory device may be provided. The PCD 600 may be, for example, a laptop or palmtop computer, cellular telephone or smartphone, personal digital assistant, navigation device, smartbook, portable game console, satellite telephone, automotive device, Internet-of-Things (IOT) device, etc. For purposes of clarity, some data buses, interconnects, signals, etc., are not shown in FIG. 6.

The PCD 600 may include an SoC 602. The SoC 602 may include a CPU 604, a GPU 606, a digital signal processor (DSP) 607, an analog signal processor 608, a modem/ modem subsystem 654, or other processors. The CPU 604 may include one or more CPU cores, such as a first CPU core 604A, a second CPU core 604B, etc., through an Nth CPU core 604N.

A display controller 610 and a touch-screen controller 612 may be coupled to the CPU 604. A touchscreen display 614 external to the SoC 602 may be coupled to the display controller 610 and the touch-screen controller 612. The PCD 600 may further include a video decoder 616 coupled to the CPU 604. A video amplifier 618 may be coupled to the video decoder 616 and the touchscreen display 614. A video port 620 may be coupled to the video amplifier 618. A universal serial bus (USB) controller 622 may also be coupled to CPU 604, and a USB port 624 may be coupled to the USB controller 622. A subscriber identity module (SIM) card 626 may also be coupled to the CPU 604.

The CPU 604 may be coupled to one or more memories, with which the CPU 604 or other processors may initiate memory transactions. The one or more memories may include both volatile and non-volatile memories. Examples of volatile memories include static random access memory (SRAM) 628 and dynamic random access memories (DRAM). A DRAM controller 632 coupled to the CPU 604 may control the writing of data to, and reading of data from, the DRAM 630.

The UFS device 631 may be an example of a non-volatile memory with which the CPU 604 or other processors may initiate memory transactions. In the illustrated example, the UFS device 631 is external to the SoC 602, but in other examples such a UFS device could be included in the SoC. The UFS device 631 may be an example of the above-described flash memory device 102 (FIG. 1). Accordingly, the UFS device 631 may be configured with the Write-Booster feature, including configured to operate in the manner described above with regard to FIGS. 4-5.

A stereo audio CODEC 634 may be coupled to the analog signal processor 608. Further, an audio amplifier 636 may be coupled to the stereo audio CODEC 634. First and second stereo speakers 638 and 640, respectively, may be coupled to the audio amplifier 636. In addition, a microphone amplifier 642 may be coupled to the sterco audio CODEC 634, and a microphone 644 may be coupled to the microphone amplifier 642. A frequency modulation (FM) radio tuner 646 may be coupled to the stereo audio CODEC 634. An FM antenna 648 may be coupled to the FM radio tuner 646. Further, stereo headphones 650 may be coupled to the stereo audio CODEC 634. Other devices that may be coupled to the CPU 604 include one or more digital (e.g., CCD or CMOS) cameras 652.

The RF transceiver or modem subsystem 654 may be coupled to the analog signal processor 608 and the CPU 604. An RF switch 656 may be coupled to the modem subsystem 654 and an RF antenna 658. In addition, a keypad 660, a mono headset with a microphone 662, and a vibrator device 664 may be coupled to the analog signal processor 608.

The SoC 602 may have one or more internal or on-chip thermal sensors 670A and may be coupled to one or more external or off-chip thermal sensors 670B. An analog-to-digital converter controller 672 may convert voltage drops produced by the thermal sensors 670A and 670B to digital signals. A power supply 674 and a power management integrated circuit (PMIC) 676 may supply power to the SoC 602.

Implementation examples are described in the following numbered clauses:

1. A method for managing a flash memory device, comprising:

determining, by a flash memory controller, whether a user space logical unit is full;

determining write buffer usage by the flash memory controller when the user space logical unit is full; and merging, by the flash memory controller when the user space logical unit is full, one or more portions of the write buffer into the user space logical unit based on the write buffer usage.

2. The method of clause 1, further comprising:

determining, by the flash memory controller when the user space logical unit is full, whether the flash memory device is in preserve user space mode;

wherein determining write buffer usage and merging the one or more portions of the write buffer are not performed unless the flash memory device is in preserve user space mode.

3. The method of clause 1 or 2, further comprising switching, by the flash memory controller when the user space logical unit is full, a configuration of the write buffer from a dedicated mode to a shared mode before merging the one or more portions of the write buffer.

4. The method of any of clauses 1-3, wherein:
determining write buffer usage includes determining a least-used portion of the write buffer among available portions of the write buffer; and
merging comprises merging the least-used portion of the write buffer into the user space logical unit.

5. The method of any of any of clauses 1-4, wherein determining write buffer usage comprises determining a usage-ranked order of all portions of the write buffer.

6. The method of clause 5, further comprising:
determining, after merging the least-used portion of the write buffer, whether available space in the user space logical unit is below a threshold; and
iteratively merging one or more further portions of the write buffer in the usage-ranked order into the user space logical unit until the available space in the user space logical unit is not below the threshold.

7. The method of any of clauses 1-6, wherein the flash memory device is Universal Flash Storage.

8. A system in a memory device, comprising:
a controller configured to:
determine whether a user space logical unit is full;
determine write buffer usage of a write buffer configured to buffer data written to the memory device; and
merge one or more portions of the write buffer into the user space logical unit based on the write buffer usage when the user space logical unit is full.

9. The system of clause 8, wherein the controller is further configured to:
determine, when the user space logical unit is full, whether the memory device is in preserve user space mode; and
refrain from determining write buffer usage and merging the one or more portions of the write buffer unless the flash memory device is in preserve user space mode.

10. The system of clause 8 or 9, further wherein the controller is further configured to, when the user space logical unit is full, switch a configuration of the write buffer from a dedicated mode to a shared mode before merging the one or more portions of the write buffer.

11. The system of any of clauses 8-10, wherein:
the controller being configured to determine write buffer usage includes the controller being configured to determine a least-used portion of the write buffer among available portions of the write buffer; and
the controller being configured to merge comprises the controller being configured to merge the least-used portion of the write buffer into the user space logical unit.

12. The system of any of clauses 8-11, wherein the controller being configured to determine write buffer usage includes the controller being configured to determine a usage-ranked order of all portions of the write buffer.

13. The system of clause 12, wherein the controller is configured to:
determine, after merging the least-used portion of the write buffer, whether available space in the user space logical unit is below a threshold; and
iteratively merge one or more further portions of the write buffer in the usage-ranked order into the user space logical unit until the available space in the user space logical unit is not below the threshold.

14. The system of any of clauses 8-13, wherein the flash memory device is Universal Flash Storage.

15. A Universal Flash Storage (UFS) memory device, comprising:
flash memory physical storage configurable into a user space logical unit and a WriteBooster write buffer;
a UFS memory controller configured to:
determine whether the user space logical unit is full;
determine write buffer usage; and
merge one or more portions of the write buffer into the user space logical unit based on the write buffer usage when the user space logical unit is full.

16. The system of clause 15, wherein the UFS memory controller is further configured to:
determine, when the user space logical unit is full, whether the UFS memory device is in preserve user space mode; and
refrain from determining write buffer usage and merging the one or more portions of the write buffer unless the UFS memory device is in preserve user space mode.

17. The system of clause 15 or 16, further wherein the UFS memory controller is further configured to, when the user space logical unit is full, switch a configuration of the write buffer from a dedicated mode to a shared mode before merging the one or more portions of the write buffer.

18. The system of any of clauses 15-17, wherein:
the UFS memory controller being configured to determine write buffer usage includes the UFS memory controller being configured to determine a least-used portion of the write buffer among available portions of the write buffer; and
the UFS memory controller being configured to merge comprises the UFS memory controller being configured to merge the least-used portion of the write buffer into the user space logical unit.

19. The system of any of clauses 15-18, wherein the UFS memory controller being configured to determine write buffer usage includes the UFS memory controller being configured to determine a usage-ranked order of all portions of the write buffer.

20. The system of clause 19, wherein the UFS memory controller is configured to:
determine, after merging the least-used portion of the write buffer, whether available space in the user space logical unit is below a threshold; and
iteratively merge one or more further portions of the write buffer in the usage-ranked order into the user space logical unit until the available space in the user space logical unit is not below the threshold.

Alternative embodiments will become apparent to one of ordinary skill in the art to which the invention pertains. Therefore, although selected aspects have been illustrated and described in detail, it will be understood that various substitutions and alterations may be made therein.

What is claimed is:
1. A method for managing a flash memory device, comprising:
determining, by a flash memory controller, whether a user space logical unit within the flash memory device is full, the user space logical unit configured as a plurality of triple-cells (TLCs) NAND flash, the flash memory device comprising a write buffer, the write buffer configured as a plurality of single-level cells (SLCs) NAND flash;
determining write buffer usage within the flash memory device by the flash memory controller when the user space logical unit is full, determining write buffer usage includes determining a least-used portion of the write buffer among available portions of the write buffer based on program/erase cycles of the SLCs; and merging, by the flash memory controller when the user space logical unit is full, the least-used portion of the write buffer into the user space logical unit.

2. The method of claim 1, further comprising:

determining, by the flash memory controller when the user space logical unit is full, whether the flash memory device is in preserve user space mode;

wherein determining write buffer usage and merging the least-used portion of the write buffer are not performed unless the flash memory device is in preserve user space mode.

3. The method of claim 1, further comprising switching, by the flash memory controller when the user space logical unit is full, a configuration of the write buffer from a dedicated mode to a shared mode before merging the least-used portion of the write buffer.

4. The method of claim 1, wherein determining write buffer usage comprises determining a usage-ranked order of all portions of the write buffer.

5. The method of claim 4, further comprising:

determining, after merging the least-used portion of the write buffer, whether available space in the user space logical unit is below a threshold; and iteratively merging one or more further portions of the write buffer in the usage-ranked order into the user space logical unit until the available space in the user space logical unit is not below the threshold.

6. The method of claim 1, wherein the flash memory device is Universal Flash Storage.

7. A system in a flash memory device, comprising:

a user space logical unit within the flash memory device, the user space logical unit configured as a plurality of triple-cells (TLCs) NAND flash, the flash memory device comprising a write buffer, the write buffer configured as a plurality of single-level cells (SLCs) NAND flash;

a controller configured to:

determine whether the user space logical unit is full;

determine write buffer usage of the write buffer when the user space logical unit is full, the write buffer configured to buffer data written to the flash memory device;

wherein determine write buffer usage of the write buffer includes determining a least-used portion of the write buffer among available portions of the write buffer based on program/erase cycles of the SLCs; and merge the least-used portion of the write buffer into the user space logical unit when the user space logical unit is full.

8. The system of claim 7, wherein the controller is further configured to:

determine, when the user space logical unit is full, whether the flash memory device is in preserve user space mode; and refrain from determining write buffer usage and merging the least-used portion of the write buffer unless the flash memory device is in preserve user space mode.

9. The system of claim 7, further wherein the controller is further configured to, when the user space logical unit is full, switch a configuration of the write buffer from a dedicated mode to a shared mode before merging the one or more portions of the write buffer.

10. The system of claim 7, wherein the controller being configured to determine write buffer usage includes the controller being configured to determine a usage-ranked order of all portions of the write buffer.

11. The system of claim 10, wherein the controller is configured to:

determine, after merging the least-used portion of the write buffer, whether available space in the user space logical unit is below a threshold; and iteratively merge one or more further portions of the write buffer in the usage-ranked order into the user space logical unit until the available space in the user space logical unit is not below the threshold.

12. The system of claim 7, wherein the flash memory device is Universal Flash Storage.

13. A Universal Flash Storage (UFS) memory device, comprising:

flash memory physical storage configurable into a user space logical unit and a WriteBooster write buffer, the user space logical unit configured as a plurality of triple-cells (TLCs) NAND flash, the WriteBooster write buffer configured as a plurality of single-level cells (SLCs) NAND flash;

a UFS memory controller configured to:

determine whether the user space logical unit is full;

determine WriteBooster write buffer usage when the space logical unit is full, wherein determine Write-Booster write buffer usage includes determining a least-used portion of the WriteBooster write buffer among available portions of the WriteBooster write buffer based on program/erase cycles of the SLCs; and merge the least-used portion of the WriteBooster write buffer into the user space logical unit when the user space logical unit is full.

14. The system of claim 13, wherein the UFS memory controller is further configured to:

determine, when the user space logical unit is full, whether the UFS memory device is in preserve user space mode; and refrain from determining WriteBooster write buffer usage and merging the least-used portion of the WriteBooster write buffer unless the UFS memory device is in preserve user space mode.

15. The system of claim 13, wherein the UFS memory controller is further configured to, when the user space logical unit is full, switch a configuration of the Write-Booster write buffer from a dedicated mode to a shared mode before merging the of the WriteBooster write buffer.

16. The system of claim 13, wherein the UFS memory controller being configured to determine WriteBooster write buffer usage includes the UFS memory controller being configured to determine a usage-ranked order of all portions of the WriteBooster write buffer.

17. The system of claim 16, wherein the UFS memory controller is configured to:

determine, after merging the least-used portion of the WriteBooster write buffer, whether available space in the user space logical unit is below a threshold; and iteratively merge one or more further portions of the WriteBooster write buffer in the usage-ranked order into the user space logical unit until the available space in the user space logical unit is not below the threshold.

* * * * *